United States Patent [19]

Imaizumi et al.

[11] Patent Number: 4,778,156
[45] Date of Patent: Oct. 18, 1988

[54] VEHICLE HEIGHT ADJUSTING DEVICE

[75] Inventors: Tomio Imaizumi, Kawasaki; Masayuki Tamaru, Yokohama, both of Japan

[73] Assignee: Tokico Ltd., Kanagawa, Japan

[21] Appl. No.: 946,502

[22] Filed: Dec. 19, 1986

[30] Foreign Application Priority Data

Dec. 20, 1985 [JP] Japan .................... 60-196213[U]

[51] Int. Cl.$^4$ .................... F16F 9/08; B06G 21/06
[52] U.S. Cl. .................... 267/64.21; 280/707
[58] Field of Search .................... 267/35, 64.16, 64.17, 267/64.19, 64.21; 280/703, 707

[56] References Cited

U.S. PATENT DOCUMENTS 4,236,074 11/1980 Chen .................... 280/707 X
4,310,172 1/1982 Claude et al. .................... 280/707 X Primary Examiner—Duane A. Reger
Attorney, Agent, or Firm—Wenderoth, Lind & Ponack

[57] ABSTRACT

A vehicle height adjusting device including a hydraulic damper having a main body and a piston rod projecting upward from the main body, an air spring unit having a shell connected to the projecting end of the piston rod and a deformable resilient member with one end secured to the shell and the other end connected to the main body thereby defining an air chamber around the piston rod. The device comprises a sensor member secured to the shell and extending vertically in the air chamber, a detected member vertically displaceably mounted on the sensor member, first and second springs acting on opposite sides of the detected member, a retainer vertically displaceably mounted on the sensor member and receiving the lower end of the second spring, and a third spring acting between the retainer and the main body.

7 Claims, 1 Drawing Sheet

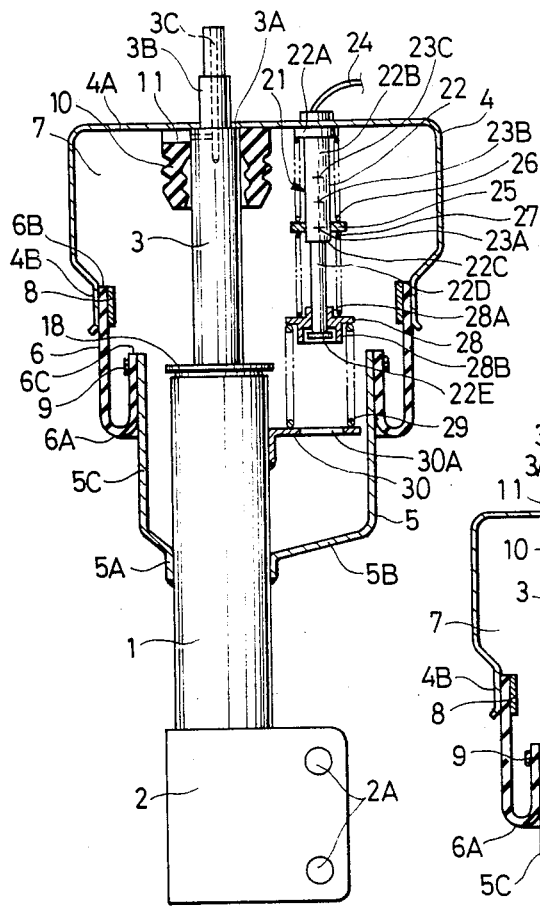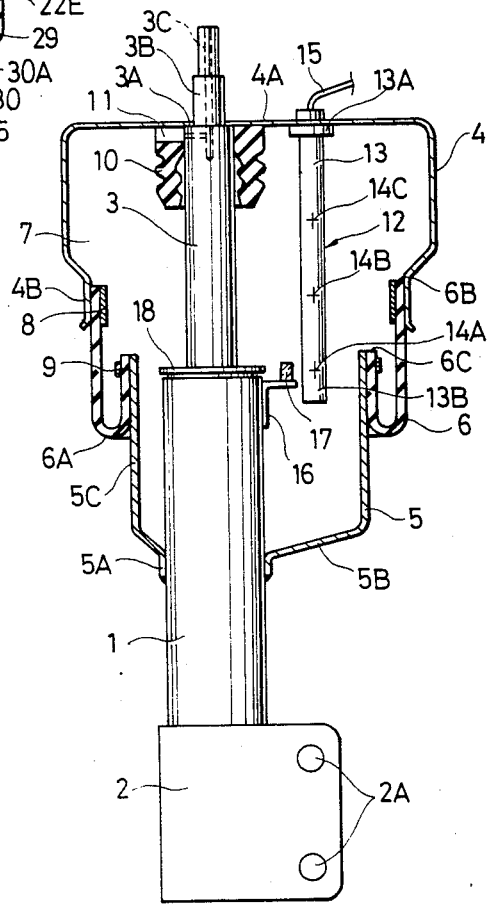

VEHICLE HEIGHT ADJUSTING DEVICE

FIELD OF THE INVENTION

The present invention relates to a vehicle height adjusting device and particularly, to a vehicle height adjusting device which is provided between a body of a vehicle such as an automobile and a wheel axle to detect the height of the vehicle and adjusts the height.

DESCRIPTION OF PRIOR ART

A typical prior art vehicle height adjusting device is shown in FIG. 2, which comprises a main body 1 of a hydraulic damper, a bracket 2 secured to the lower end portion of the hydraulic damper main body 1 for mounting the main body 1 to a wheel axle (not shown) of a vehicle and having mounting holes 2A and 2A for receiving bolts and the like, and a piston rod 3 slidingly projecting from the upper end of the main body 1 and having on the upper end portion thereof a shoulder portion 3A and a two-stepped reduced diameter portion 3B. A pressurized air supplying and exhausting hole 3C is formed in the upper end portion of the piston rod 3 as shown in the drawing.

A shell 4 having an inverted pot-like configuration is secured to the shoulder portion 3A of the piston rod 3 by means of a nut (not shown) or the like. The shell 4 has a closed base portion 4A on the upper end and a reduced diameter portion 4B on the lower end. A tubular member 5 is integrally secured to the hydraulic damper main body 1 with the lower end portion 5A being secured to the outer circumference of the intermediate portion of the main body 1 by means such as welding, and has a bottom portion 5B extending radially outwards from the lower end portion 5A and a tubular portion 5C extending axially upwards from the outer circumference of the bottom portion 5B to surround the main body 1. The shell 4 and the tubular member 5 are eccentrically connected to the main body 1 and the piston rod 3, so as to receive therein a sensor 12 and related parts which will be explained hereinafter.

A rubber member 6 cooperates with the shell 4 and the tubular member 5 to surround the piston rod 3 and the upper portion of the main body 1 thereby defining an air chamber 7. The rubber member 6 has a U-shaped bent portion 6A in the intermediate portion, an outer peripheral portion 6B sealingly secured to the reduced diameter portion 4B of the shell 4 through a ring 8, and an inner peripheral portion 6C sealingly secured to the tip end portion of the tubular portion 5C of the tubular member 5 through a ring 9. The rubber member 6 is resiliently deformable so as to permit relative axial or vertical displacement between the shell 4 and the tubular member 5 caused by the extension and contraction of the hydraulic damper. A bump rubber 10 is provided on the lower surface of the base portion 4A of the shell 4 to surround the piston rod 3, and has an air passage 11 to communicate the air chamber 7 with the air hole 3C. By adjusting the air pressure in the air chamber 7 the overall length of the hydraulic damper is adjusted and the height of the vehicle is adjusted.

The sensor 12 is disposed in the air chamber 7 to detect the height of the vehicle, and comprises a rod 13 extending vertically in the air chamber 7 with one end 13A being sealingly secured to the base portion 4A of the shell 4 and the other or the lower end 13B being a free end. A predetermined number such as three of reed switches 14A, 14B and 14C are disposed between upper and lower end 13A and 13B and define predetermined spaces therebetween. The switches 14A, 14B and 14C coact with a magnet 17, which will be described hereinafter, and generate a vehicle height detecting signal through lead wire 15 indicating that the vehicle is at the high, intermediate and low positions respectively when the magnet 17 approaches respective switches. The rod 13 extends vertically in the air chamber 7 by a sufficient length such that the lower end 13B is at the lower side of the magnet 17 which is located on the upper side of the damper main body 1 even when the vehicle is at the highest position as shown in FIG. 2.

The magnet 17 is mounted on a generally L-shaped supporting bracket secured to the damper main body 1 by such as welding, and is located at a level nearly equal to the upper end of the damper main body 1 and adjacent to the rod 13. The magnet 17 acts to close respective switches 14A, 14B and 14C when the switches approach the magnet in response to contraction and expansion of the air chamber 7 thereby generating vehicle height detect signal. The magnet is arranged not to contact with the bump rubber 10 or with the upper end 4A of the shell 4. A bump rubber receiver 18 is secured on the upper end of the damper main body 1 to coact with the bump rubber 10.

The vehicle height adjusting device having the construction as described heretofore is mounted on a vehicle with the bracket 2 being connected to the wheel axle and the upper end 3B of the piston rod 3 being connected to the body of the vehicle, thereby supporting the vehicle body. In supplying pressurized dry air from a source of pressurized air such as a compressor (not shown) into the air chamber 7 through the hole 3C and the passage 11 or exhausting the pressurized air from the air chamber 7 the height of the vehicle can be adjusted.

When the vehicle is at the high position as shown in the drawing, the leed switch 14A is near to the magnet 17 and generates a signal indicating that the vehicle height is high. The pressurized air in the air chamber 7 is exhausted through the passage 11 and the hole 3C thereby contracting the air chamber 7 and retracting the piston rod 3. The rod 13 displaces downward relative to the damper main body 1 and, when the leed switch 14B approaches the magnet 17 the lead switch 14B generates a signal indicating that the vehicle is at the medium height condition.

However, there are shortcomings in aforesaid prior art device in that the magnet 17 is secured to the damper main body 1 through the bracket 16, and the switches 14A, 14B and 14C are secured to the shell 4 through the rod 13 extending vertically in the air chamber 7 so that the rod 13 extends vertically by a length corresponding to the stroke length of the hydraulic damper whereby the lower end 13B of the rod 13 may collide with the bottom portion 5B of the tubular member 5 when the piston rod 3 is extremely contracted. Thus, the length of the rod 13 is restricted which restricts the range of detection of the vehicle height. It is possible to mount the magnet 17 at a location higher than the upper end of the damper main body 1, but that may cause the collision between the magnet 17 and the shell 4. Further, in mounting the elongated rod 13 on the shell 4 it is necessary to avoid inclination or bending, otherwise, the transverse space or the distance between the magnet 17 and respective switches may be changed which is inexpedient to reliable height signals.

SUMMARY OF THE INVENTION

An object of the present invention is to overcome the aforesaid shortcomings in the prior art device and to provide a vehicle height adjusting device that is this reliably detect the vehicle height in a wide range.

The vehicle height adjusting device according to the invention comprises a hydraulic damper main body, a piston rod slidingly extending through the upper end of the hydraulic damper main body and projecting upwards, a shell with base end portion thereof being secured to the projecting end of the piston rod, a rubber member with one end thereof being secured to the shell and the other end being connected to the hydraulic damper main body to define an air chamber around the piston rod and upper portion of the hydraulic damper main body in cooperation with the shell, a sensor member for detecting the vehicle height and extending axially in the air chamber with one end being secured to the base end portion of the shell, a detected member disposed around the sensor member and axially displaceable relative thereto, first and second springs acting on axially opposite sides of the detected member, a retainer displaceably provided on the sensor member at a location near to the other end of the sensor member and supporting the detected member through the second spring, and a third spring acting between the hydraulic damper main body and the retainer for biasing the retainer member in the axially upward direction.

BRIEF DESCRIPTION OF THE DRAWINGS

A preferred embodiment of the invention will now be explained with reference to the drawings, wherein:

FIG. 1 is a vertical sectional view of a vehicle height adjusting device according to the present invention, and FIG. 2 is a vertical sectional view of a prior art vehicle height adjusting device.

DETAILED DESCRIPTION OF PREFERRED EMBODIMENTS

The device shown in FIG. 1 according to the present invention is generally similar to the device shown in FIG. 2 and the same reference numerals are applied to corresponding parts and the description therefor is omitted.

A sensor member 21 is disposed in the air chamber 7 to detect the vehicle height in response to the extension and contraction of the air chamber 7. The sensor member 21 consists of a rod member 22 extending vertically or axially in the air chamber 7. The rod member 22 includes a large diameter mounting portion 22A on one end or the upper end of the rod member 22 and being secured sealingly to the base end portion 4A of the shell 4, a medium diameter rod portion 22B extending axially downwards from the large diameter portion 22A, a stop or radial shoulder 22C on the lower end of the medium diameter portion 22B, a small diameter rod portion 22D extending axially downwards from the medium diameter portion 22B, and an annular flange 22E provided on the lower end of the small diameter portion 22D. There are provided in the medium diameter portion 22B of the rod member 22 a plurality such as three of leed switches 23A, 23B and 23C acting respectively as sensors and being arranged at axially spaced relation therebetween. The rod member 22 is shorter than prior art sensor member such that when the vehicle height is high as shown in FIG. 1 the lower end of the rod member is substantially higher than the upper end of the hydraulic damper main body 1. As shown in FIG. 1, the spaces between respective switches are shorter than that of prior art. An annular magnet 25 acting as the detected member surrounds slidingly the medium diameter portion 22B of the rod member 22, and is supported by first and second springs 26 and 27 which are arranged axially opposite sides of the magnet 25. The first spring 26 is supported by the large diameter mounting portion 22A of the rod member 22, and the second spring 27 is supported by an annular retainer 28 which is slidingly mounted on the small diameter portion 22D of the rod member 22. Preferably, the springs 26 and 27 have equal characteristics such that the displacement of the magnet 25 with respect to the upper end of the spring 26 is half of the displacement of the retainer 28 with respect to the upper end of the spring 26, however, it is possible to change the ratio of the displacement of the magnet 25 and the retainer 28 as desired by changing the characteristics of the springs 26 and 27. The upward movement of the retainer 28 is restricted by the stop or shoulder portion 22C of the rod member 22 and the downward movement is restricted by the flange 22E of the rod member 22, thus, excessive extension or contraction of springs 26 and 27 can be prevented. A third spring 29 acts between the lower side of the retainer 28 and a generally L-shaped bracket 30 which is secured to the hydraulic damper main body 1. Preferably, the spring 29 is sufficiently stronger than springs 26 and 27 so that the spring 29 does not substantially deflect until the springs 26 and 27 are fully compressed and the retainer 28 abuts with the shoulder portion 22C of the rod member 22. A hole 30A is formed in the bracket 30 so that the flange 22E of the rod member 22 can pass through the hole 30A when the height of the vehicle is excessively decreased.

The operation of the device shown in FIG. 1 is similar to the device shown in FIG. 2, however, the device of FIG. 1 comprises the magnet 25 slidingly fitted on the medium diameter portion 22B of the rod member 22 and the axially opposite sides of the magnet 25 are supported by springs 26 and 27 having relatively low spring constant, thereby obtaining following functional effects.

When the vehicle height is high as shown in FIG. 1, the magnet 25 is located near to the reed switch 23A to generate detection signal indicating that the vehicle height is high. The pressurized air in the air chamber 7 is exhausted through the passage 11 and the hole 3C to contract the air chamber 7, the piston rod 3 retracts and the shell 4 moves downward, and the rod member 22 moves downward. The retainer 28 is supported by third spring 29 which is stronger than springs 26 and 27, thus the retainer takes the position shown in the drawing. The springs 26 and 27 deflect equally between the retainer 28 and the mounting portion 22A. As the result, the magnet 25 displaces downward by an amount nearly ½ of the amount of displacement of the piston rod 3 or the rod member 22. When the rod member 2 is displaced in the downward direction, the magnet 25 displaces downward by an amount corresponding to half of that of the piston rod 3 or the rod member 22 and, when the vehicle is at the intermediate height condition, the magnet 25 takes a position adjacent to the leed switch 23B which generates a signal indicating that the vehicle is at the medium height condition, through the lead wire 24. When the air in the air chamber 7 is further exhausted and the height of the vehicle takes the low position, the reed switch 23C cooperates with the magnet 25 to detect the low position. When pressurized air is supplied to the air chamber 7 to expand the air chamber 7, the magnet 25 acts to cooperate with switches 23A, 23B and 23C to generate corresponding height signals.

When the vehicle receives severe vibrations in the vertical directions and the piston rod 3 contracts over the normal stroke, the retainer 28 abuts with stop or shoulder portion 22C thereby preventing excessive deflection of springs 26 and 27 and, even when the bump rubber 10 abuts with the bump rubber receiver 18, the third spring 29 is compressed between the bracket 30 and the retainer 28, and the spring 29 act to absorb the shock. And when the piston rod 3 extends excessively, the retainer 28 engages with the flange 22E of the rod member 22, and the spring 29 separates from the bracket 30, thus, failure in the sensor member 21 or the magnet 25 can be prevented.

According to the embodiment, the magnet 25 displaces relative to the damper main body 1 by about half of the displacement of the rod member 22, thus, it is possible to reduce the length of the rod member 22 amply and, to detect the vehicle height over a wide range. Further, when the vehicle receives severe vibrations, and the piston rod 3 contracts largely, the spring 29 acts to apply a damping effect, and when the piston rod 3 extends largely the spring 29 may separate from the bracket 30 thereby the normal operation of the magnet 25 and the switches is assured.

Further, since the magnet 25 is slidingly mounted on the rod member 22, the detection of the vehicle height can reliably be maintained even if the rod member would be inclined.

In the embodiment, the deflection of springs 26 and 27 are equal to each other, however, the spring constant of springs 26 and 27 may be determined as desired, and the distance between switches 23A, 23B and 23C should be determined in accordance with the ratio of the spring constant of springs 26 and 27.

Further, the reed switches 23A, 23B and 23C may be substituted by other sensors such as magnetic resistance elements or the like, and the magnet 25 acting as the detected member may be substituted by other member such as a member cooperating with photo sensors. Further, it is possible to provide four or more sensors. Further, in the embodiment, the spring 29 engages with and is retained by the retainer 28, but the spring 29 may be retained on the bracket 30 with the upper end of the spring 29 separably engaging with the retainer 28. The bracket 30 may be mounted on the tubular member 5.

As described heretofore, according to the invention, the detected member is axially displaceably provided on or around the sensor member, first and second springs are provided axially opposite sides of the detected member to assure the axial displacement of the detected member in relation to the change in the vehicle height, an axially displaceable retainer is also mounted on the sensor member to support the second spring, and a third spring is provided between the retainer and the damper main body. Thus, the amount of displacement of detected member can be reduced as compared with that of the sensor member, thereby enabling to reduce the length of the sensor member and to increase the detection range of the vehicle height. Further, the operation is reliable.

What is claimed is:

1. A vehicle height adjusting device comprising a hydraulic damper main body, a piston rod slidingly extending through the upper end of the hydraulic damper main body and projecting upwards, a shell with base end portion thereof being secured to the projecting end of the piston rod, a rubber member with one end thereof being secured to the shell and the other end being connected to the hydraulic damper main body to define an air chamber around the piston rod and the upper portion of the hydraulic damper main body in cooperation with the shell, a sensor member for detecting the vehicle height and extending axially in the air chamber with one end being secured to the base end portion of the shell, a detected member disposed around the sensor member and axially displaceable relative thereto, first and second springs acting on axially opposite sides of the detected member, a retainer displaceably provided on the sensor member at a location near to the other end of the sensor member and supporting the detected member through the second spring, and a third spring acting between the hydraulic damper main body and the retainer for biasing the retainer in the axially upward direction.

2. A vehicle height adjusting device as recited in claim 1, wherein said first and second springs have equal characteristics.

3. A vehicle height adjusting device as recited in claim 1, wherein a stop for restricting the upward movement of the retainer is provided on the sensor member, thereby preventing excessive compression of the first and second springs.

4. A vehicle height adjusting device as recited in claim 3, wherein the third spring is sufficiently stronger than said first and second springs such that the third spring is not substantially compressed until the retainer engages with the stop.

5. A vehicle height adjusting device as recited in claim 1, wherein the upper end of the third spring is connected to the retainer and the lower end of the third spring is separably supported on a bracket which is secured to the hydraulic damper main body.

6. A vehicle height adjusting device as recited in claim 1, wherein the ratio between the relative displacement of the sensor member and the detected member and the relative displacement of the damper main body and the piston rod is smaller than 1.

7. A position detecting device for detecting the position of a damper main body relative to the position of a piston rod of the damper main body, said device comprising a sensor member and a detected member that are movable reciprocatingly relative to each of the other along a line parallel to the movement of the piston rod, and the ratio between the relative displacement of the sensor member and the detected member and the relative displacement of the damper main body and the piston rod is smaller than 1.

* * * * *